No. 749,950. PATENTED JAN. 19, 1904.
W. POWELL.
FREE WHEEL AND BRAKE ATTACHMENT FOR CYCLES.
APPLICATION FILED AUG. 20, 1902.
NO MODEL.

Witnesses:
E. B. Bolton
Ethel C. Smith

Inventor:
William Powell
By Richards & Co
his Attorneys

No. 749,950. Patented January 19, 1904.

UNITED STATES PATENT OFFICE.

WILLIAM POWELL, OF NORMANTON, ENGLAND.

FREE-WHEEL AND BRAKE ATTACHMENT FOR CYCLES.

SPECIFICATION forming part of Letters Patent No. 749,950, dated January 19, 1904.

Application filed August 20, 1902. Serial No. 120,398. (No model.)

*To all whom it may concern:*

Be it known that I, WILLIAM POWELL, a subject of the King of Great Britain and Ireland, and a resident of Ivanhoe Terrace, Normanton, in the county of Derby, England, have invented certain new and useful Improvements in Free-Wheel and Brake Attachments for Cycles, (for which I have applied for a patent in Great Britian, numbered 4,949 and bearing date February 27, 1902,) of which the following is a specification.

The object of my invention is to provide an improved free-wheel and back-pedaling brake attachment for cycles, whereby safety and silence are secured.

Figure 1:
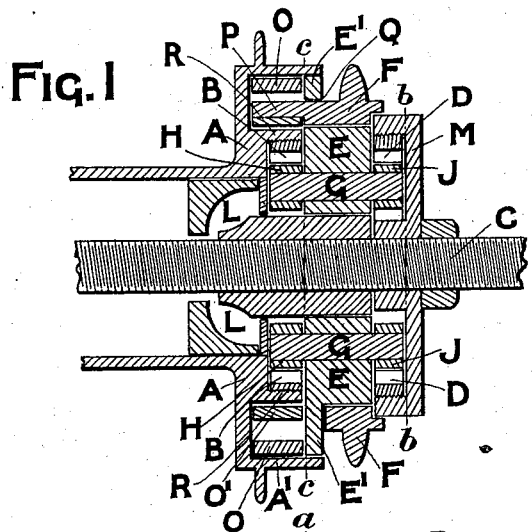
Figure 2:
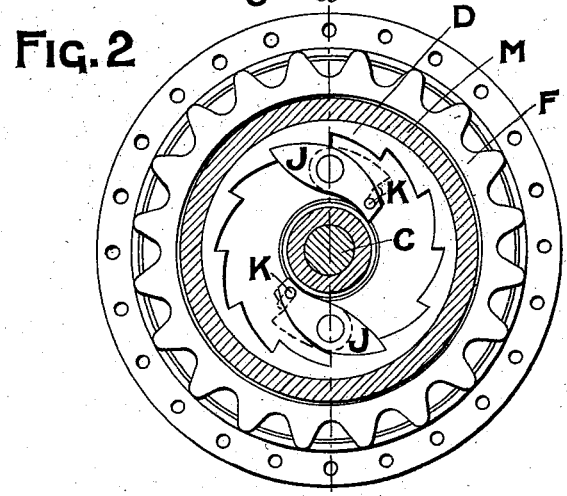
Figure 3:
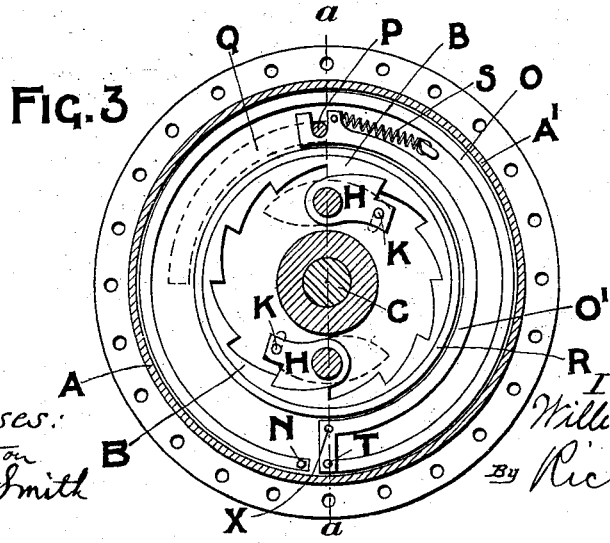

Referring to the drawings, which form a part of this specification, Figure 1 is a vertical section upon line $a\ a$ of Figs. 2 and 3, showing my invention applied to the right-hand side of the rear-wheel hub of a bicycle. Fig. 2 is a sectional elevation upon line $b\ b$ of Fig. 1 looking toward the hub. Fig. 3 is a sectional elevation upon line $c\ c$ of Fig. 1 also looking toward the hub.

In carrying out my said invention I cause to be fixed on the hub A of the back wheel a ratchet-wheel B for forward driving, and on the axle C or to a cover M carried thereby parallel to the ratchet-wheel B is fixed another ratchet-wheel D, with teeth in the opposite direction, the teeth in each case being either on the outside or inside of the wheel or in the one case on the outside and in the other case on the inside. They are both shown upon the inside in the drawings. Between and outside these is the sprocket-wheel, consisting of two concentric rings E and F, one sliding over the other.

On each side of the inner ring E are arranged one or more pawls H J, respectively adapted to engage the ratchets B and D and connected through the inner ring by any suitable means, so that when either pawl is full in its ratchet the other pawl is held clear and that if necessary both pawls may simultaneously clear or pass over their respective ratchets, each pawl being pressed toward its ratchet by means of a spring. One means of carrying this out is to connect the pawls by a flexible pin or spring K. This will in turn press one pawl to its ratchet and lift the other pawl out of its ratchet. Another means is to connect the pawls by a rigid connection so arranged as to allow each pawl a slight circular motion with respect to the other, as by a rigid pin fixed to one of the pawls and working in a slot in the other pawl, using a separate spring to press each pawl to its ratchet.

L is the ball-race between the hub and axle. I may, if found desirable, introduce an additional ball-race between and forming part of the inner ring E and the outer cover M, in which case the cone of the ball-race L would be formed upon the inner ring E.

The action of this device is as follows: When the machine is stationary, the pawl J will be engaging the ratchet D. Upon forward motion of the inner ring E the pawl J is caused to run up the ratchet D. The spring K then depresses the pawl H into engagement with the ratchet B, and when the pawl H is pressed into full engagement with the ratchet B the pawl J is lifted clear of the ratchet D and the machine is driven forward without noise between ratchet and pawl. In "free-wheeling" the same action takes place in a reverse way. The backward pressure of the pedals engages the pawl J in the ratchet D, fixed on the axle, and lifts the other pawl H out of the ratchet B on the hub, the wheel running freely. The whole is inclosed by a suitable side plate or cover M.

Reference will now be made to the brake part of my invention. The sprocket-wheel, as already stated, consists of an inner and an outer ring E and F, respectively, the latter carrying the sprockets and the inner one carrying the pawls H and J. The outer ring is shouldered into the inner ring and has a limited backward and forward motion, as shown upon Fig. 3. On the inner ring E is a flange E', inclosing the mouth of the brake-drum. In the inner ring is fixed a stud N, to which is attached an expanding ring O, with an inner continuation O' passing partly round the hub to the opposite side and being connected there by means of a stud P through a concentric slot Q in the flange E' to the outer ring F of the sprocket-wheel. The said ring O O' when expanded engages with a drum R on or forming part of the hub A. Fixed to a stud in the flange E' is a spring S to prevent the brake being put on unnecessarily.

The action of the braking device is as follows: On backward pedaling the pawl J engages in the ratchet D on the axle and holds the inner ring E fast. One stud N of the brake is therefore fast also. Further backward pressure causes the outer ring F of the sprocket-wheel to slide on the inner and the stud P placed in it to move in the concentric slot Q in the flange E' of the inner ring. This movement first causes the inner continuation O' of the expanding ring O to grip the inner portion of or drum R on the hub A. Still further backward pressure transforms this part of the expanding ring into a lever working on the hub or drum and causing the outer portion of the expanding ring to engage the inner face of an annulus A', fixed on the hub A, the ring being pivoted at T. The inner ring O' instead of working on the hub as a fulcrum may, if found desirable, be pivoted to the inner ring at X.

The inner continuation O' may, if desired, be dispensed with and the stud P act directly upon the free end of the ring O.

Having now described my invention, what I claim as new, and desire to secure by Letters Patent, is—

1. In a free-wheel and back-pedaling attachment for cycles, the combination of a sprocket-wheel consisting of an inner and an outer ring, the latter being free to slide on the former, a stud carried by the outer part, a brake connected to the said stud and consisting of an inner and an outer band connected together, one end of said brake being fixed to the inner part of the said sprocket-wheel while the other end is operated by the said stud, and the drum and annulus against which the brake acts, the said inner and outer parts of the brake-band being located between the drum and annulus, substantially as described.

2. In combination, a sprocket-wheel, a ratchet on each side of the same, pawls engaging the ratchets, a connection between the pawls extending through the sprocket-wheel, the said sprocket-wheel consisting of the inner and outer part, the latter being free to slide on the former, a stud on the outer part, a brake connected with the said stud and consisting of an inner and an outer band connected together, one end of said brake being connected to the inner part of the sprocket while the other end is operated by the said stud, substantially as described.

3. In a free-wheel attachment for cycles, and in combination with the hub of the back wheel and its non-rotating axle, a sprocket-wheel rotating about said axle, a ratchet-wheel alongside the sprocket-wheel and held against rotation on the said non-rotary axle, a ratchet-wheel on the opposite side of the said sprocket-wheel and connected with the hub of the wheel, pawls on opposite sides of the sprocket-wheel to engage the ratchets and a connection between the pawls extending through the sprocket-wheel, substantially as described.

In witness whereof I have hereunto set my hand in presence of two witnesses.

WILLIAM POWELL.

Witnesses:
W. SWINDELL,
B. B. WILSON.